Aug. 13, 1940.   J. H. PRESSLEY   2,211,073
POWER SUPPLY CIRCUIT
Filed Sept. 8, 1939
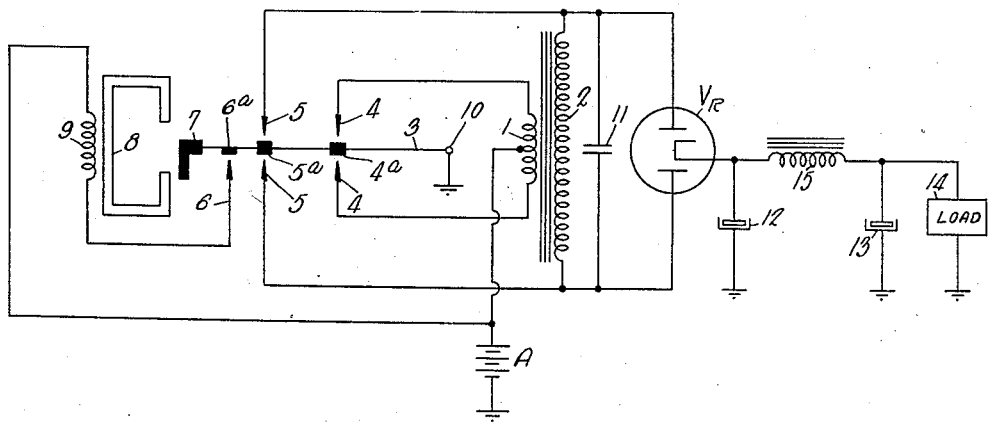
Inventor:-
Jackson H. Pressley
by his Attorneys
Howson & Howson Patented Aug. 13, 1940

2,211,073

UNITED STATES PATENT OFFICE 2,211,073

POWER SUPPLY CIRCUIT

Jackson H. Pressley, Marion, Ind., assignor, by mesne assignments, to Pennsylvania Patents, Inc., Carson City, Nev., a corporation of Nevada Application September 8, 1939, Serial No. 294,033

6 Claims. (Cl. 171—97)

This invention relates to improvements in power supply circuits and the like, and more particularly to power supply circuits which employ a circuit breaker, such as a vibrator, in the transformation of direct current of one voltage to alternating current of another and generally higher voltage.

Circuits of the type referred to are often supplied with means for rectifying and filtering the high voltage alternating current output, and are frequently utilized in supplying high-voltage direct current to radio receivers and the like from a source of low voltage direct current, such as a storage battery.

By means of the present invention, it is possible to secure full-wave rectification without the requirement of a center-tapped secondary winding, and with only half the number of secondary turns normally employed. The resultant saving in copper is of particular importance in the mass manufacture of radio receivers and the like, while the savings in weight and space are of particular importance where the apparatus is to be employed in light and compact mobile installations.

According to one feature of the invention there is provided a power supply system comprising a transformer having a primary winding and a secondary winding, said primary winding being provided with a center-tap, a source of direct current, mechanical means for cyclically connecting opposite ends of said primary winding to a point on said source, a connection between a second point on said source and said center-tap, a load circuit, mechanical means synchronous with said first named mechanical means for cyclically connecting opposite ends of said secondary winding to one side of said load, and means for deriving a unidirectional voltage from said secondary winding and for impressing said voltage on said load.

It is an important object of this invention to provide an improved vibrator-type power supply, or the like, capable of being manufactured at a substantially lower cost than has been possible heretofore.

Another object of this invention is to greatly reduce the weight and size of power supply systems of the type referred to.

Still another object of this invention is to provide a power supply circuit adapted to full wave rectification wherein the entire transformer secondary winding is utilized during each alternation of the secondary voltage.

The invention may best be understood by reference to the accompanying drawing, the single figure of which is representative of one embodiment of the invention.

In the drawing there is shown a source of direct current A, such as a storage battery, a transformer having primary winding 1 and secondary winding 2, a mechanical switching means 3 and associated contacts 4, 5, and 6, a rectifying means $V_R$ which may comprise a vacuum tube discharge device, a filter system comprising the series choke 15 and shunt capacitors 12 and 13, and a load 14. The mechanical switching means may be of the rotating commutator type, but is preferably of the vibrating reed type. In the embodiment shown, the reed may be of metal with no insulation between the contact points 4a, 5a, and 6a, since all make-and-break contacts have been returned to a common point, in this case ground.

The reed 3 may be maintained in a vibrating state by any suitable driving means. In the drawing, the driving means comprises the electromagnet 8—9, the iron pole piece 7, and the make-and-break contacts 6 and 6a, whereby the winding 9 is energized cyclically from the battery A.

In order to produce the required alternating magnetic flux in the transformer core, one terminal of the battery A is preferably connected to the electrical center of the primary winding 1. The reed 3 which is connected to the other battery terminal (through ground for example) will, when set in vibration, alternately connect opposite ends of the winding 1 to said other battery terminal, thereby producing an alternating current in the transformer winding. The frequency of this current may, of course, be predetermined by employing a tuned reed having a desired rate of vibration, for example, 60 cycles per second.

In the embodiment shown, the entire secondary winding 2 is employed during each alternation, or half-cycle. The efficient use of the secondary winding as contemplated by this invention, may be secured by avoiding the use of a center-tap and by alternately connecting opposite ends of the secondary winding to one side of the load, in this case to ground. The latter may be accomplished by means of the vibrating reed 3 and the contact points 5 and 5a. While separate reeds may be employed for the several sets of contacts, it is preferred, in the interests of more perfect synchronism between primary and secondary circuits, to employ a common reed 3 as illustrated. To obtain the desired rectification of the secondary current, similar electrodes of a full-wave rectifier unit may be connected to opposite ends of the secondary winding 2, while a dissimilar electrode may be connected to a point on the load circuit. Where a vacuum tube rectifier $V_R$ is employed having a pair of anodes connected to opposite ends of the winding 2, and a common cathode connected to the load, the connections to the vibrator contacts are preferably made in such a way that the negative end of the winding 2 is always connected to the low potential or ground side of the load through the ground connection 10, contact 5a and one of the contacts 5, depending upon the portion of the alternating current cycle. In this way the ungrounded rectifier anode will in general have a higher positive potential than ground, and when the instantaneous anode voltage exceeds the voltage across the input capacitor 12 an electrical current will flow into the filter system from the rectifier, as will be well understood in the art.

As compared with prior art vibrator-type power supply circuits employing a center-tapped secondary for full-wave rectification, the system herein disclosed permits a saving of at least 50% of the copper employed in the secondary. Actually it is possible to save more than 50% of the copper in the secondary winding, due to the decreased average length per turn of the wire when the total number of turns is reduced. Similarly because of the resulting substantial reduction in winding volume an important saving in transformer iron may be effected.

In the interests of simplicity the various capacitive and resistive filters and anti-sparking circuits have been omitted. Normally it may be desirable to include one or more of these circuits as will be well understood in the art. Similarly it may be desirable to provide conventional choke coil filters in various of the input and output circuits for the purpose of reducing interference due to sparking and the like. A buffer condenser 11 may be connected across the secondary winding 2 to assist in the control of wave shape and sparking. Under certain conditions it has been found that improved operation results if the vibrator contacts are spaced in such a manner that the primary contacts close slightly before and open slightly after the secondary contacts. This however is not a general rule and in any case the precise timing of the system should be determined by trial and observation.

It will be understood that the invention is not limited to the specific embodiment illustrated, but is capable of various modifications as to detail and structure.

I claim:

1. A power supply system comprising a transformer having a primary winding and a secondary winding, said primary winding being provided with a center-tap, a source of direct current, mechanical means for cyclically connecting opposite ends of said primary winding to a point on said source, a connection between a second point on said source and said center-tap, a load circuit, mechanical means synchronous with said first-named mechanical means for cyclically connecting opposite ends of said secondary winding to one side of said load, and means for deriving a unidirectional voltage from said secondary winding and for impressing said voltage on said load.

2. A power supply system comprising a transformer having a primary winding and a secondary winding, said primary winding being provided with a center-tap, a source of direct current, mechanical means for cyclically connecting opposite ends of said primary winding to a point on said source, a connection between a second point on said source and said center-tap, a load circuit, mechanical means synchronous with said first-named mechanical means for cyclically connecting opposite ends of said secondary winding to one side of said load, a rectifying means having at least three electrodes, connections between two of said electrodes and opposite ends of said secondary winding, and a connection between the third rectifier electrode and the other side of said load.

3. A power supply system comprising a transformer having a primary winding and a secondary winding, a source of direct current, connections between said source and said primary winding, mechanical switching means disposed in said connections for cyclically reversing the flow of current in said primary winding, a load circuit having two terminals, mechanical means synchronous with said switching means, for cyclically connecting opposite ends of said secondary winding to one terminal of said load, a rectifier tube having at least two anodes and a cathode, a connection between one of said anodes and one end of said secondary winding, a connection between the other anode and the opposite end of said secondary winding, and a connection between said cathode and the other terminal of said load.

4. A power supply system comprising a transformer having a primary winding and a secondary winding, said primary winding being provided with a center-tap, a source of direct current, mechanical means for cyclically connecting opposite ends of said primary winding to a point on said source, a connection between a second point on said source and said center-tap, a load circuit having a first terminal and a second terminal, mechanical switching means synchronous with said first-named mechanical means for cyclically connecting opposite ends of said secondary winding to a first terminal of said load, a rectifier tube having at least a cathode and first and second anodes, a connection between one end of said secondary winding and said first anode, a connection between the opposite end of said secondary winding and said second anode, and a connection between said anode and the second terminal of said load, said last-named connection including an electric filter means.

5. A power supply system comprising a transformer having a primary winding and a secondary winding, said primary winding being provided with a center-tap, a source of direct current, a tuned reed having a plurality of contact points thereon, electromagnetic driving means associated with said reed for causing continuous vibration of said reed, a first pair of contacts cooperatively associated with contacts on said reed for cyclically connecting opposite ends of said primary winding to a point on said source and in synchronism with the vibration of said reed, a connection between a second point on said source and said center-tap, a load circuit having a first terminal and a second terminal, a second pair of contacts cooperatively associated with contacts on said reed for cyclically connecting opposite ends of said secondary winding to said first terminal and in synchronism with the vibration of said reed, and a current rectifying device connected between said second pair of contacts and the second terminal of said load circuit.

6. A power supply system comprising a transformer having a primary winding and a secondary winding, said primary winding being provided with a center-tap, a source of direct current, a tuned reed having a plurality of contact points thereon, electromagnetic driving means associated with said reed for causing continuous vibration of said reed, a first pair of contacts cooperatively associated with contacts on said reed for cyclically connecting opposite ends of said primary winding to a point on said source and in synchronism with the vibration of said reed, a connection between a second point on said source and said center-tap, a load circuit having a first terminal and a second terminal, a second pair of contacts cooperatively associated with contacts on said reed for cyclically connecting opposite ends of said secondary winding to said first terminal and in synchronism with the vibration of said reed, a rectifier tube having at least a cathode and first and second anodes, a connection between one end of said secondary winding and said first anode, a connection between the opposite end of said secondary winding and said second anode, and a connection between said anode and the second terminal of said load, said last-named connection including an electric filter means.

JACKSON H. PRESSLEY.